United States Patent
Kim et al.

(10) Patent No.: US 10,788,956 B2
(45) Date of Patent: Sep. 29, 2020

(54) SCREEN DISPLAY METHOD AND APPARATUS OF A MOBILE TERMINAL

(71) Applicant: Samsung Electronics Co., Ltd., Suwon-si, Gyeonggi-do (KR)

(72) Inventors: Tae Yeon Kim, Seoul (KR); Jae Myoung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/397,415

(22) Filed: Apr. 29, 2019

(65) Prior Publication Data

US 2019/0250779 A1 Aug. 15, 2019

Related U.S. Application Data

(63) Continuation of application No. 15/185,689, filed on Jun. 17, 2016, now Pat. No. 10,275,124, which is a (Continued)

(30) Foreign Application Priority Data

Oct. 20, 2010 (KR) .................. 10-2010-0102405

(51) Int. Cl.
*G06F 3/0483* (2013.01)
*G06F 3/0485* (2013.01)
(Continued)

(52) U.S. Cl.
CPC .......... *G06F 3/0483* (2013.01); *G06F 3/0482* (2013.01); *G06F 3/0485* (2013.01);
(Continued)

(58) Field of Classification Search
CPC .. G06F 3/0483; G06F 3/0482; G06F 3/04845; G06F 3/0485; G06F 3/04855; G06F 3/04883; G06Q 10/109
See application file for complete search history.

(56) References Cited

U.S. PATENT DOCUMENTS 6,085,205 A 7/2000 Peairs et al.
6,380,953 B1 4/2002 Mizuno
(Continued)

FOREIGN PATENT DOCUMENTS

CN 1542634 A 11/2004
CN 1811899 A 8/2006
(Continued)

OTHER PUBLICATIONS

The key is diagrams that easily organize and display the information flow: higher quality presentations with PowerPoint, PC Lessons from the Beginning 3~Digital Documents, Japan Nikkei BP, Jan. 5, 1998, p. 50 to 62.
(Continued)

*Primary Examiner* — Tadesse Hailu
(74) *Attorney, Agent, or Firm* — Jefferson IP Law, LLP

(57) ABSTRACT

A screen display method and apparatus of a mobile terminal is provided for changing a screen represented by an index to another screen represented by a newly selected index. A screen display method of a mobile terminal includes displaying a page represented by an index, the page including an index region having a plurality of indices and a content region displaying content corresponding to the index highlighted in the index region, selecting a new index in the index region according to a selection input, and changing the page represented by the highlighted index for a new page represented by the new index, the new page appearing in a direction from a position of the new index to a position of the highlighted index.

20 Claims, 14 Drawing Sheets

[a]

[b]

[c]

Related U.S. Application Data continuation of application No. 14/685,863, filed on Apr. 14, 2015, now Pat. No. 9,372,600, which is a continuation of application No. 13/275,650, filed on Oct. 18, 2011, now Pat. No. 9,021,382.

(51) Int. Cl.
    *G06F 3/0488*     (2013.01)
    *G06F 3/0482*     (2013.01)
    *G06F 3/0484*     (2013.01)
    *G06Q 10/10*     (2012.01)

(52) U.S. Cl.
    CPC ...... *G06F 3/04845* (2013.01); *G06F 3/04855* (2013.01); *G06F 3/04883* (2013.01); *G06Q 10/109* (2013.01)

(56) References Cited

U.S. PATENT DOCUMENTS

| | | |
|---|---|---|
| 6,407,757 B1 | 6/2002 | Ho |
| 6,466,236 B1 | 10/2002 | Pivowar et al. |
| 8,068,251 B2 | 11/2011 | Sakuramata et al. |
| 8,949,139 B2 | 2/2015 | Yang et al. |
| 2001/0024195 A1 | 9/2001 | Hayakawa |
| 2002/0063732 A1 | 5/2002 | Mansikkaniemi et al. |
| 2004/0125081 A1 | 7/2004 | Hayakawa |
| 2005/0003870 A1 | 1/2005 | Nakano et al. |
| 2006/0090141 A1 | 4/2006 | Loui et al. |
| 2006/0156259 A1 | 7/2006 | Wagner et al. |
| 2006/0246955 A1 | 11/2006 | Nirhamo et al. |
| 2006/0271864 A1 | 11/2006 | Satterfield et al. |
| 2007/0058210 A1 | 3/2007 | Sakuramata et al. |
| 2007/0198948 A1 | 8/2007 | Toriyama |
| 2007/0254722 A1 | 11/2007 | Kim et al. |
| 2007/0260503 A1 | 11/2007 | Pan et al. |
| 2007/0266327 A1 | 11/2007 | Ritcher et al. |
| 2008/0016444 A1 | 1/2008 | Choi |
| 2008/0165151 A1 | 7/2008 | Lemay et al. |
| 2008/0225014 A1 | 9/2008 | Kim |
| 2008/0294994 A1 | 11/2008 | Kruger et al. |
| 2009/0006994 A1 | 1/2009 | Forstall et al. |
| 2009/0083644 A1 | 3/2009 | Kimura |
| 2009/0094562 A1 | 4/2009 | Jeong et al. |
| 2009/0100380 A1* | 4/2009 | Gardner ................ G06F 3/0483 715/854 |
| 2009/0152349 A1 | 6/2009 | Bonev et al. |
| 2009/0172532 A1 | 7/2009 | Chaudhri |
| 2009/0174680 A1 | 7/2009 | Anzures et al. |
| 2009/0267909 A1 | 10/2009 | Chen |
| 2010/0099462 A1 | 4/2010 | Baek et al. |
| 2010/0162105 A1 | 6/2010 | Beebe et al. |
| 2010/0214237 A1 | 8/2010 | Echeverri et al. |
| 2010/0235733 A1 | 9/2010 | Drislane et al. |
| 2010/0295805 A1 | 11/2010 | Shin et al. |
| 2010/0298034 A1 | 11/2010 | Shin et al. |
| 2010/0302188 A1 | 12/2010 | Bamford et al. |
| 2011/0063234 A1 | 3/2011 | Liu |
| 2011/0078622 A1 | 3/2011 | Missig et al. |
| 2011/0167369 A1 | 7/2011 | Van Os |

FOREIGN PATENT DOCUMENTS

| | | |
|---|---|---|
| CN | 1822653 A | 8/2006 |
| CN | 101273327 A | 9/2008 |
| CN | 101281443 A | 10/2008 |
| CN | 101599000 A | 12/2009 |
| CN | 101739194 A | 6/2010 |
| EP | 0 336 868 A2 | 10/1989 |
| JP | H02-168349 A | 6/1990 |
| JP | H03-214219 A | 9/1991 |
| JP | 3-282924 A | 12/1991 |
| JP | H11-212700 A | 8/1999 |
| JP | 2001-265481 A | 9/2001 |
| JP | 2002-111839 A | 4/2002 |
| JP | 2003-316630 A | 11/2003 |
| JP | 2003-316821 A | 11/2003 |
| JP | 2004-62695 A | 2/2004 |
| JP | 2006-139614 A | 6/2006 |
| JP | 2007-41724 A | 2/2007 |
| JP | 2008-107865 A | 5/2008 |
| RU | 2007 137 568 A | 6/2009 |
| RU | 2396727 C2 | 8/2010 |
| WO | 2008/086301 A2 | 7/2008 |
| WO | 2008/111112 A1 | 9/2008 |
| WO | 2011/084859 A1 | 7/2011 |

OTHER PUBLICATIONS

Hirayama Satosi, Personal Data Management Device PalmTop, Information Processing Society Research Report vol. 91, No. 12 91-MIC-65, Information Processing Society , Feb. 1, 1991, edition 91, No. 12, p. 1 to 8.

Japanese Office Action dated Oct. 1, 2018, issued in the Japanese Application No. 2017-067132.

Japan Nikkei BP; Flow organization and easy to understand illustrations are the key: More appealing presentations with "one Point," Lesson 3 in learning the basics of PC application; Digital Document; Jan. 5, 1998.

Russian Decision on Grant of a Patent for Invention dated Feb. 24, 2016.

Korean Intellectual Property Office Action dated Jan. 15, 2019, issued in Korean Application No. 10-2010-0102405.

Chinese Office Action dated Oct. 31, 2019, issued in Chinese Application No. 201710256586.1.

Chinese Notice of Allowance dated Jul. 2, 2020, issued in Chinese Application No. 201710256586.1.

\* cited by examiner

FIG. 9
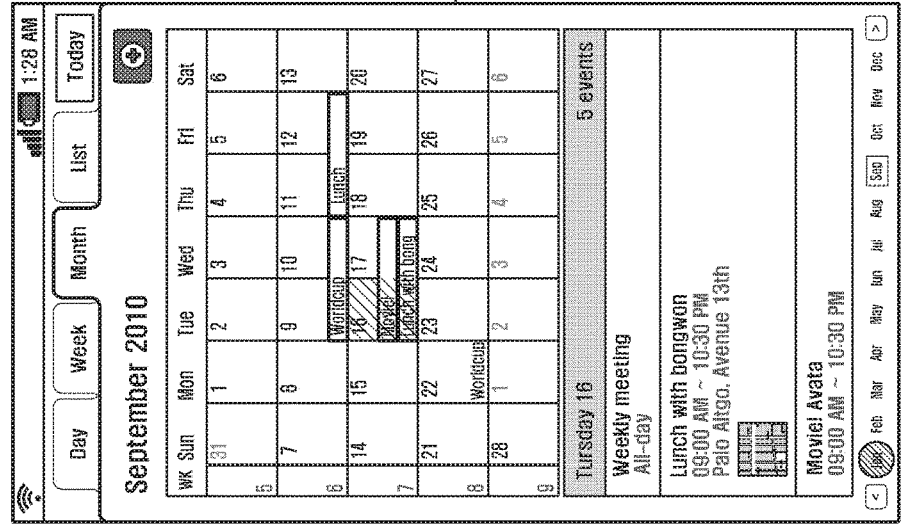
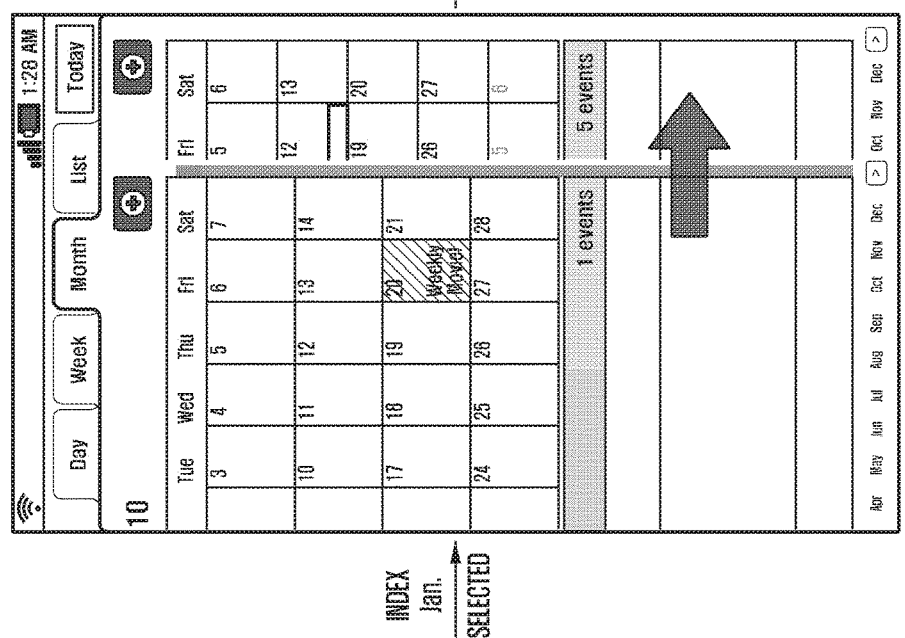
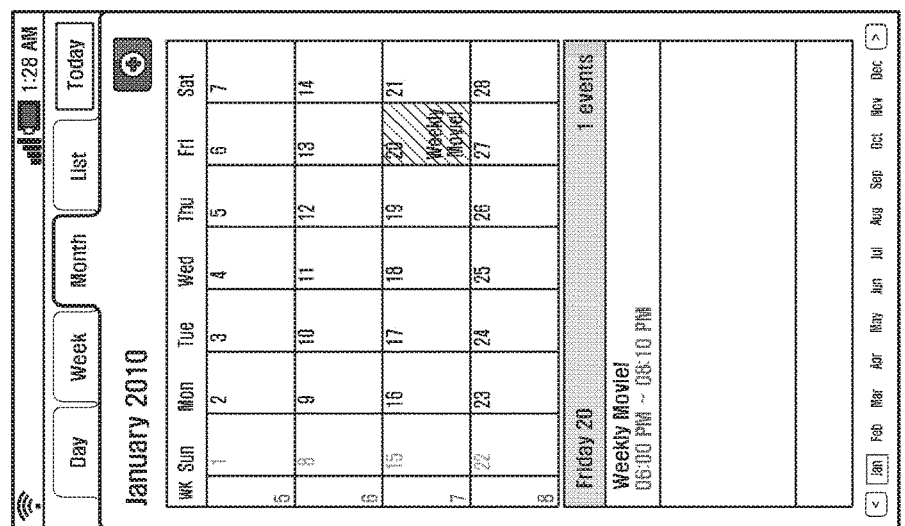

FIG. 11
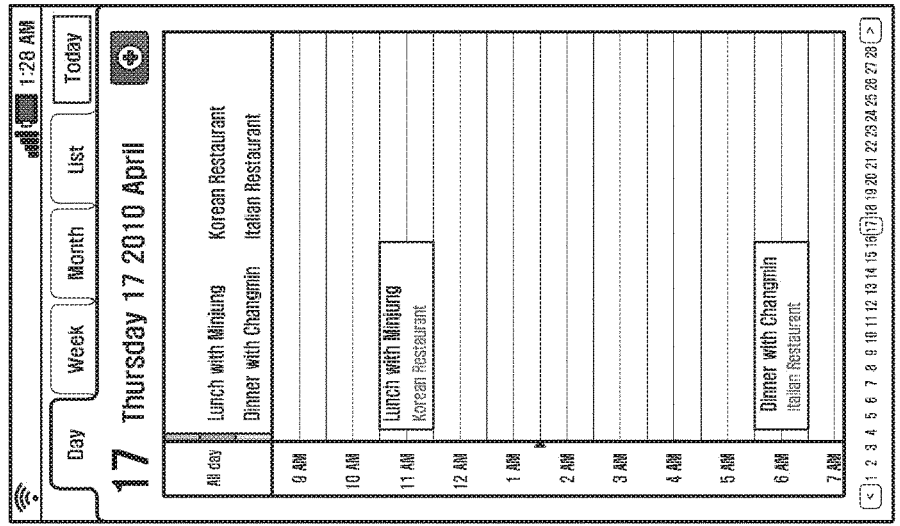
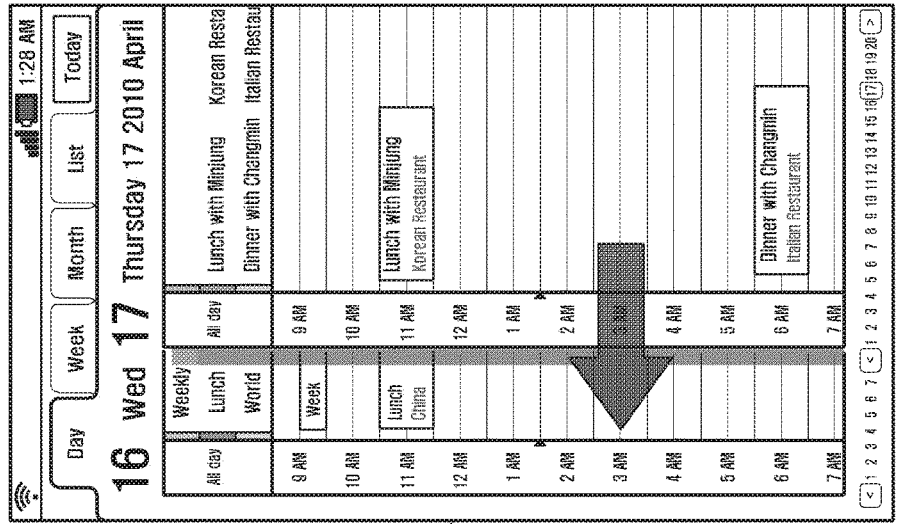
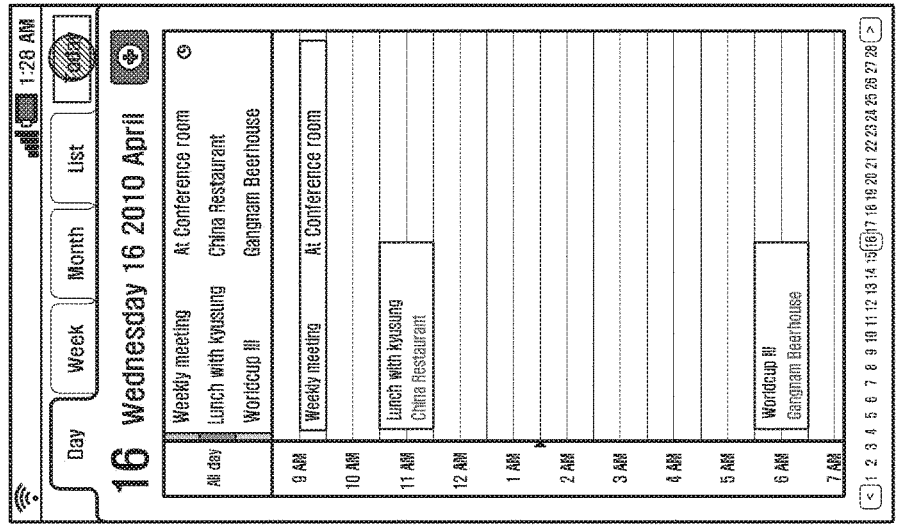

FIG. 12
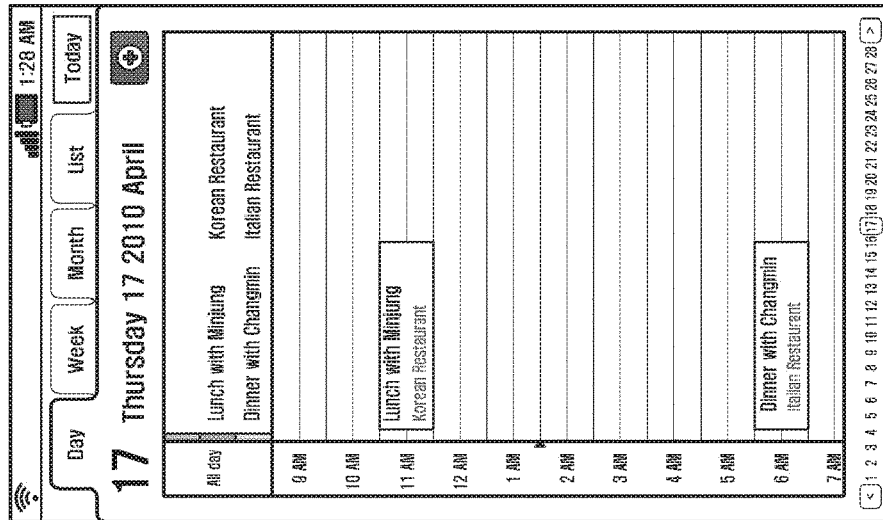
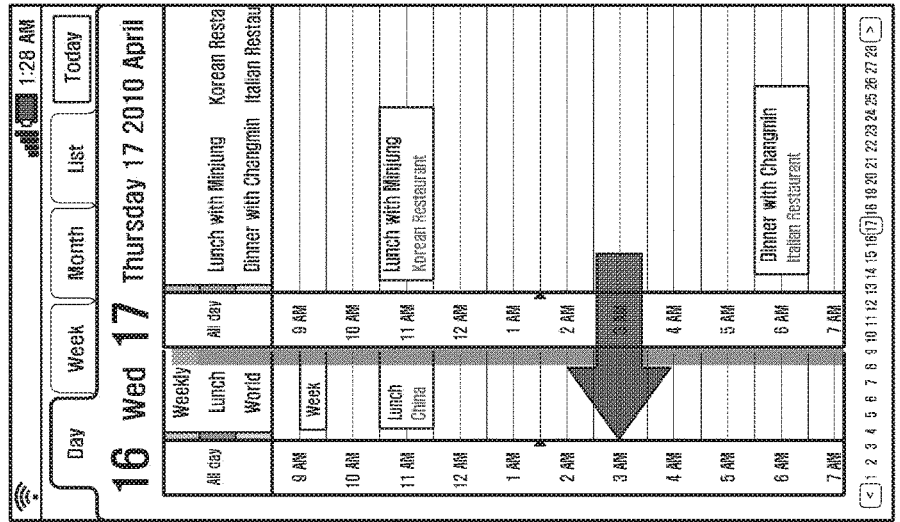
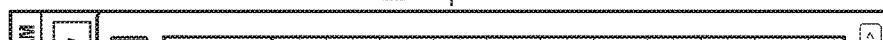
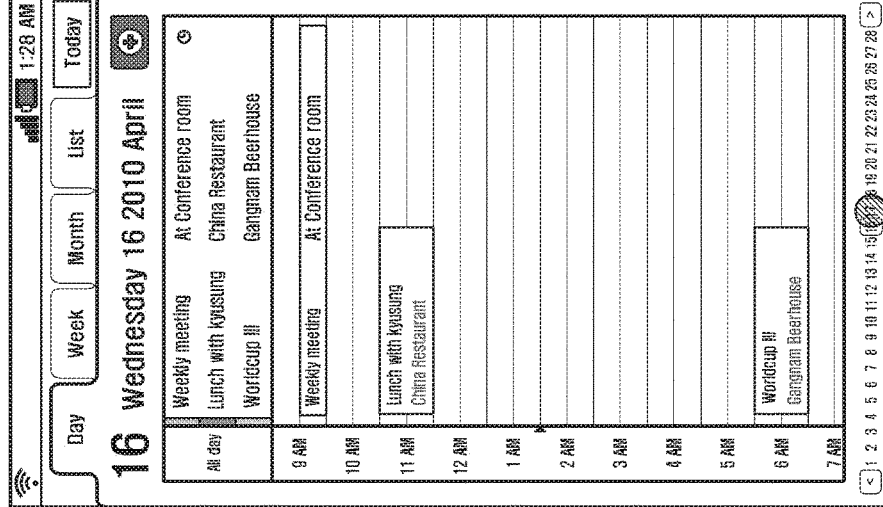

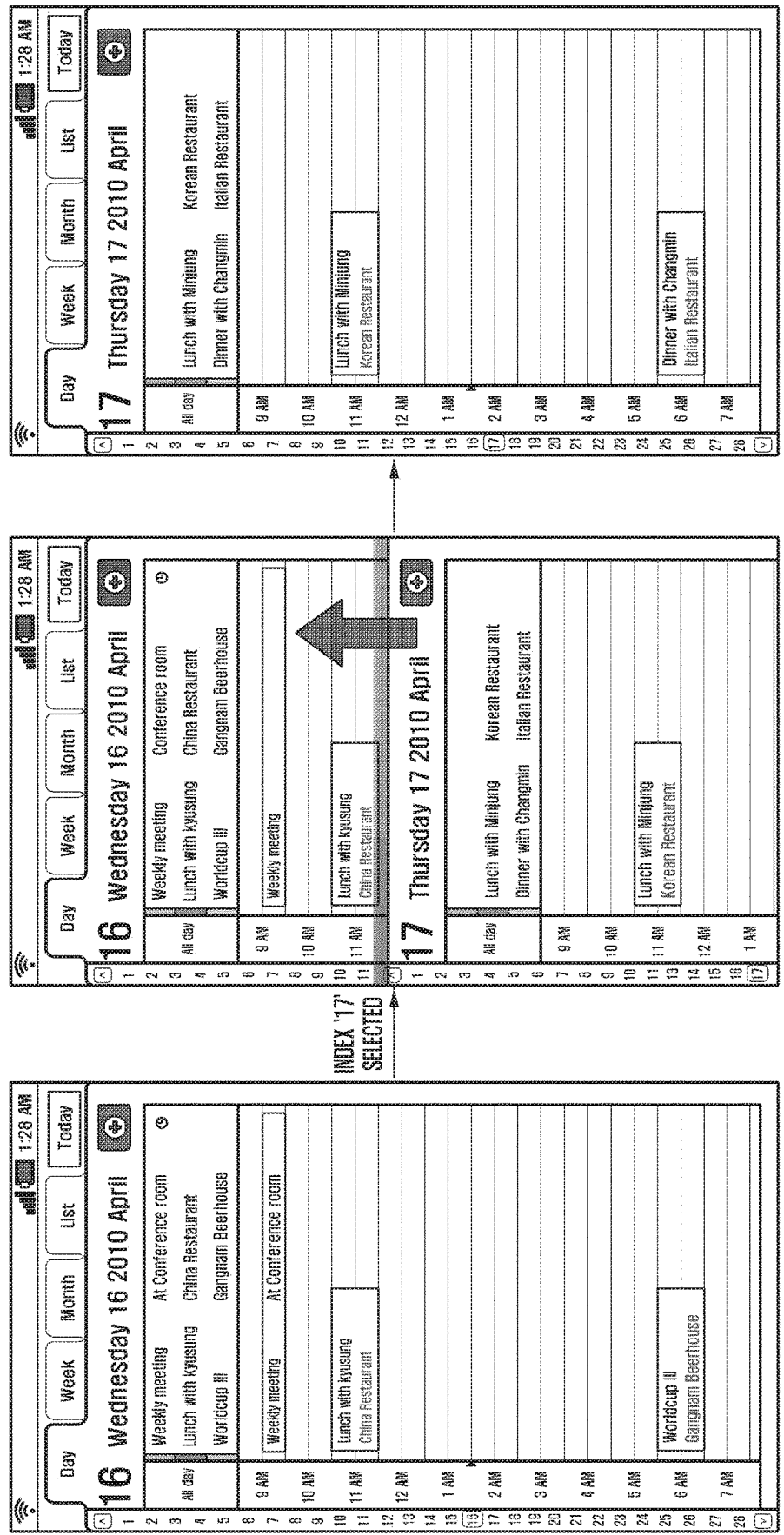

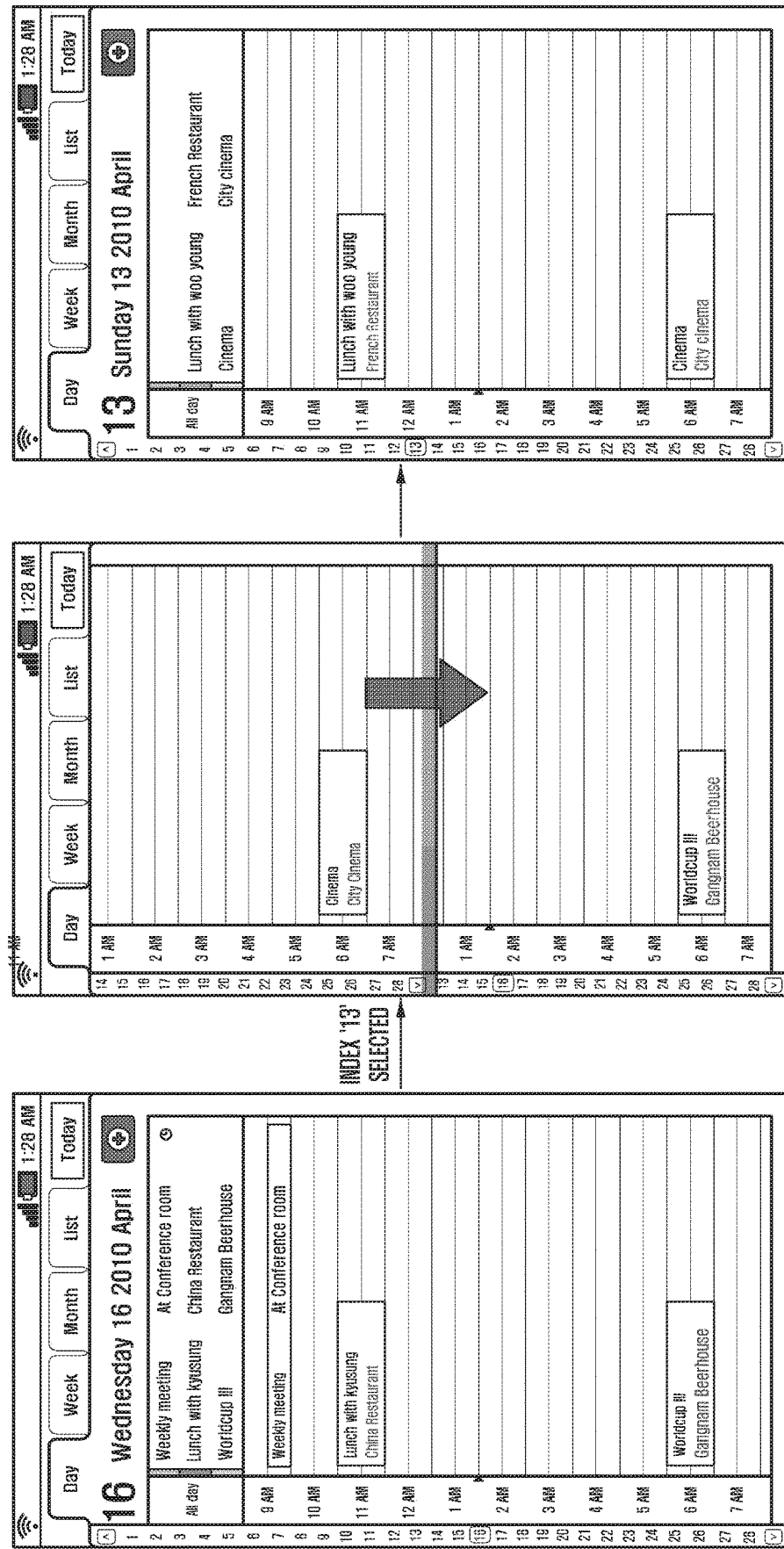

SCREEN DISPLAY METHOD AND APPARATUS OF A MOBILE TERMINAL

CLAIM OF PRIORITY

This application is a continuation application of a prior application Ser. No. 15/185,689, filed on Jun. 17, 2016, which has issued as U.S. Pat. No. 10,275,124 on Apr. 30, 2019; which is a continuation application of prior application Ser. No. 14/685,863, filed on Apr. 14, 2015, which has issued as U.S. Pat. No. 9,372,600 on Jun. 21, 2016; which is a continuation application of a prior application Ser. No. 13/275,650, filed on Oct. 18, 2011, which issued as U.S. Pat. No. 9,021,382 on Apr. 28, 2015; and which claimed the benefit of a Korean patent application filed on Oct. 20, 2010 in the Korean Intellectual Property Office and assigned Serial number 10-2010-0102405, the entire disclosure of each of which is hereby incorporated by reference.

BACKGROUND

Field of the Invention

The present invention relates to the field of mobile terminals and, in particular, to a screen display method and apparatus of a mobile terminal for changing a display screen.

Description of the Related Art

With the widespread use of mobile technologies, the mobile terminal has become one of the everyday commodities in modern life. Mobile terminals have evolved to be multimedia communication devices supporting various data transmission and supplementary services as well as traditional voice communication service. As the supplementary services supported by the mobile terminal become more diversified, much research is being conducted to facilitate receiving and processing user inputs and presenting information to the user efficiently. Most of the research and development regarding the user interfaces are directed to the intuitiveness of the user manipulation.

SUMMARY

It is an objective of the present invention to provide a screen display method and apparatus of a mobile terminal that is capable of providing an intuitive presentation for user operation.

In accordance with an aspect of the present invention, a screen display method of a mobile terminal, comprises displaying a page represented by an index, the page including an index region having a plurality of indices and a content region displaying content corresponding to an index highlighted in the index region, selecting a new index in the index region according to a selection input and changing the page represented by the highlighted index with a new page represented by the new index, the new page appearing in a direction from a position of the new index to a position of the highlighted index.

In accordance with another aspect of the present invention, a mobile terminal comprises a display unit which displays a page represented by an index, the page including a category region having at least one category, and an index region presenting indices subcategorizing the category selected in the category region, and a content region presenting content corresponding to an index highlighted in the index region, a touch sensing unit that detects a touch gesture for selecting an index in the index region and a control unit which controls the display unit to present a new page associated with a new index selected in the index region, the new page appearing from a position of the new index to a position of the highlighted index.

BRIEF DESCRIPTION OF THE DRAWINGS

FIG. 9 is a diagram illustrating a monthly view screen change operation of a calendar application when an index positioned to the left of the currently highlighted index is selected in the mobile terminal according to an embodiment of the present invention;

FIG. 11 is a diagram illustrating a daily view screen change operation of a calendar application when a today button is selected in the state where the Day category is activated in the mobile terminal according to an embodiment of the present invention;

FIG. 12 is a diagram illustrating a daily view screen change operation of a calendar application, when an index positioned to the left of the currently highlighted index is selected, in the mobile terminal according to another embodiment of the present invention;

FIG. 13 is a diagram illustrating a daily view screen change operation of a calendar application, when an index positioned below the currently highlighted index is selected in the index region configured in a vertical direction, in the mobile terminal according to an embodiment of the present invention; and FIG. 14 is a diagram illustrating a daily view screen change operation of a calendar application, when an index positioned above the currently highlighted index is selected in the index region configured in a vertical region in the mobile terminal according to an embodiment of the present invention.

DETAILED DESCRIPTION

Although the description is directed to a mobile terminal in the following description, the present invention is not limited thereto but can be applied to all the kinds of the devices equipped with a touchscreen. According to an embodiment of the present invention, the mobile terminal is one of a number of different types of information communication devices and multimedia devices such as a touchscreen-enabled device and, preferably, can be a cellular phone, a Portable Multimedia Player (PMP), a Personal Digital Assistant (PDA), a Smartphone, and a MP3 player. Particularly, the present invention can be applied to the portable devices equipped with an intermediate or large size display equal to or greater than 7 inches as well as a small size display equal to or smaller than 4 inches.

Figure 1:
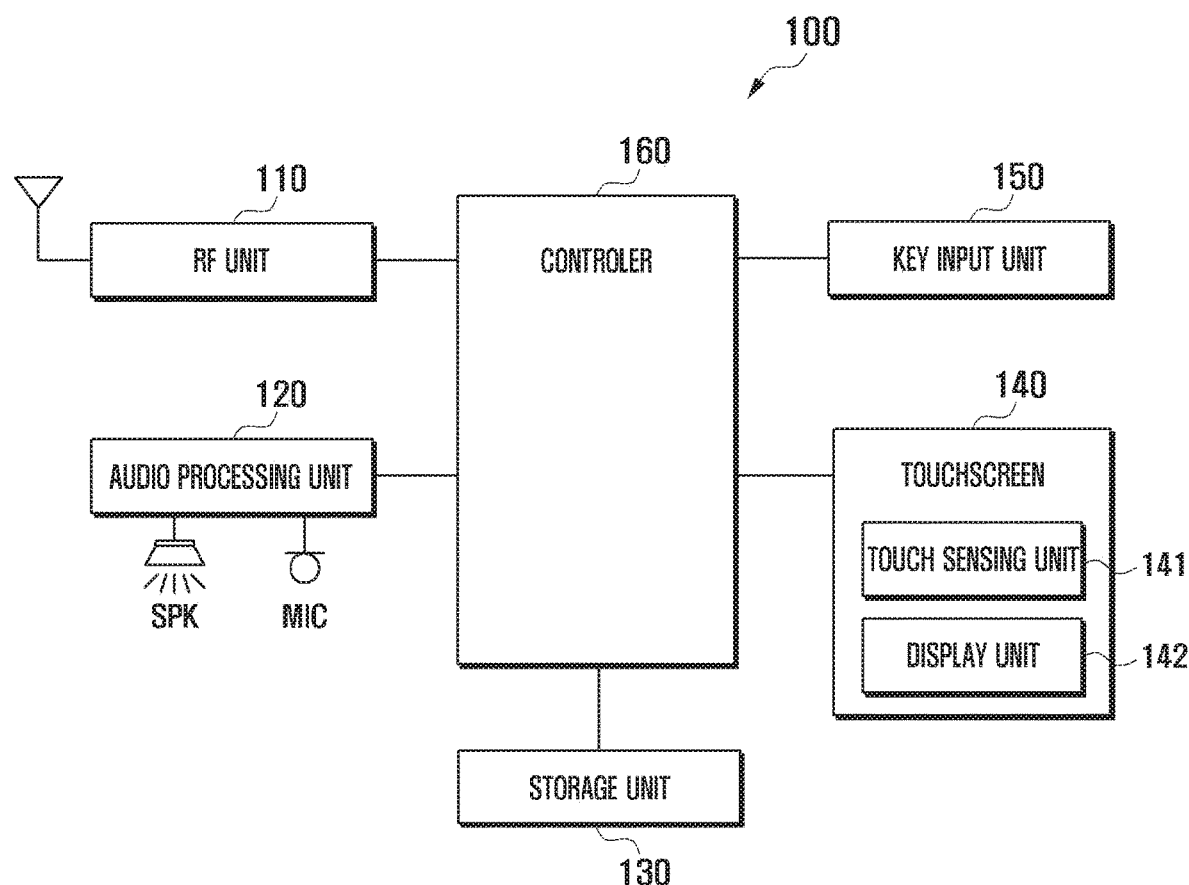
FIG. 1 is a diagram illustrating a configuration of the mobile terminal according to an embodiment of the present invention.

FIG. 1 is a diagram illustrating a configuration of the mobile terminal according to an embodiment of the present invention. The mobile terminal 100 according to an embodiment of the preset invention includes a Radio Frequency (RF) unit 110, an audio processing unit 120, a storage unit 130, a touchscreen 140, a key input unit 150, and a control unit 160.

The RF unit 110 is responsible for transmitting and receiving radio signals carrying data. The RF unit 110 includes an RF transmitter for up-converting and amplifying transmit signals and an RF receiver for low noise amplifying and down-converting received signals. The RF unit 110 outputs the data received over the radio channel to the controller 160 and transmits the data output by the controller 160 over a network (not shown).

The audio processing unit 120 includes a codec pack, and the codec pack can include a data codec (not shown) for processing packet data and an audio codec (not shown) for processing audio signals including voice. The audio processing unit 120 converts a digital audio signal into an analog audio signal by means of the audio codec so as to play out an analog audio signal through a speaker in the form of an audible sound wave and converts the analog audio signal input through a microphone (MIC) into the digital audio signal.

The storage unit 130 stores the programs and data necessary for the operations of the mobile terminal 100 and can be divided into a program region (not shown) and a data region (not shown). The program region stores the programs for controlling general operations of the mobile terminal, an Operating System (OS) for booting up the mobile terminal, applications programs necessary for playing multimedia contents, and other application programs necessary for supporting other functions of the mobile terminal 100. For example, such other functions may be a camera function, an audio playback function, and a still image and/or a motion picture (video) playback function. The data region stores the data generated as a result of the operation of the mobile terminal 100. For example, the data region may include information regarding still images, motion pictures (video data), phonebook, and audio data.

The touchscreen 140 includes a touch sensing unit 141 and a display unit 142. The touch sensing unit 141 detects a touch input made by the user. The touch sending unit 141 can be implemented with one of a touch sensor (such as capacitive overlay touch sensor, resistive overlay touch sensor, and infrared beam touch sensor) and a pressure sensor. The touch sensing unit 141 also can be implemented with any of the sensors that can detect the contact or pressure on the screen made by an object. The touch sensing unit 141 can detect a user input made by a user's touch gesture and generates an input signal to the control unit 160. The input signal includes the coordinates defining the position at which the touch input is made. In case that a movement touch gesture is detected, the touch sensing unit 141 generates an input signal that includes coordinates on the path of the movement touch gesture to the control unit 160. In an embodiment of the present invention, the movement touch gesture can be categorized into one of two categories: flick in which the speed of the movement touch gesture is equal to or greater than a predetermined value and a drag in which the speed of the movement touch gesture is less than the predetermined value.

The display unit 142 can be implemented with one of a Liquid Crystal Display (LCD), an Organic Light Emitting Diodes (OLED), and an Active Matrix OLED (AMOLED) and presents the menus, user input data, functions settings information, and other information to the user in visual data format. The display unit 142 is responsible for outputting a booting screen, a standby screen, a menu screen, a call progressing screen, and other application execution screens. In an embodiment of the present invention, the display unit 142 can provide a screen composed of a category region having categories classified according to the top most conceptual classification criteria, an index region presenting the indices belonged to the currently selected category, and a content region presenting the content indicated by the currently highlighted index, as will be further discussed.

The key input unit 150 receives a key input made by the user for manipulating the mobile terminal 100 and, as a consequence, generates an input signal to the control unit 160. The key input unit 150 can be implemented with a key pad having alphanumeric and navigation keys and additional function keys formed at a side of the mobile terminal 100. In case that the mobile terminal 100 is configured so as to be fully manipulated by means of the touchscreen 140, the key input unit 150 can be omitted according to an embodiment of the present invention.

The control unit 160 controls the operations of the mobile terminal. According to an embodiment of the present invention, the control unit 160, which may be represented as a processor or a computer, controls the display unit 142 to display the screen composed of a category region having the categories classified according to the top most conceptual classification criteria, index region presenting the indices belonged to the currently selected category, and a content region presenting the content indicated by the currently highlighted index. When a touch gesture for selecting one of the indices, except for the currently highlighted index, is detected by means of the touch sensing unit 141, the control unit 160 controls the display unit 142 such that the content corresponding to the selected index is presented in a direction from the selected index to the originally highlighted index. In case that the indices are arranged in series in a horizontal direction, the control unit 160 controls the display unit 142 such that the content corresponding to the index selected by the user appears in the direction from left to right, when the user selects the index positioned to the left of the currently highlighted index, and controls the display unit 142 such that the content corresponding to the index selected by the user appears in the direction from right to left, when the user selects the index positioned to the right of the currently highlighted index.

Figure 2:
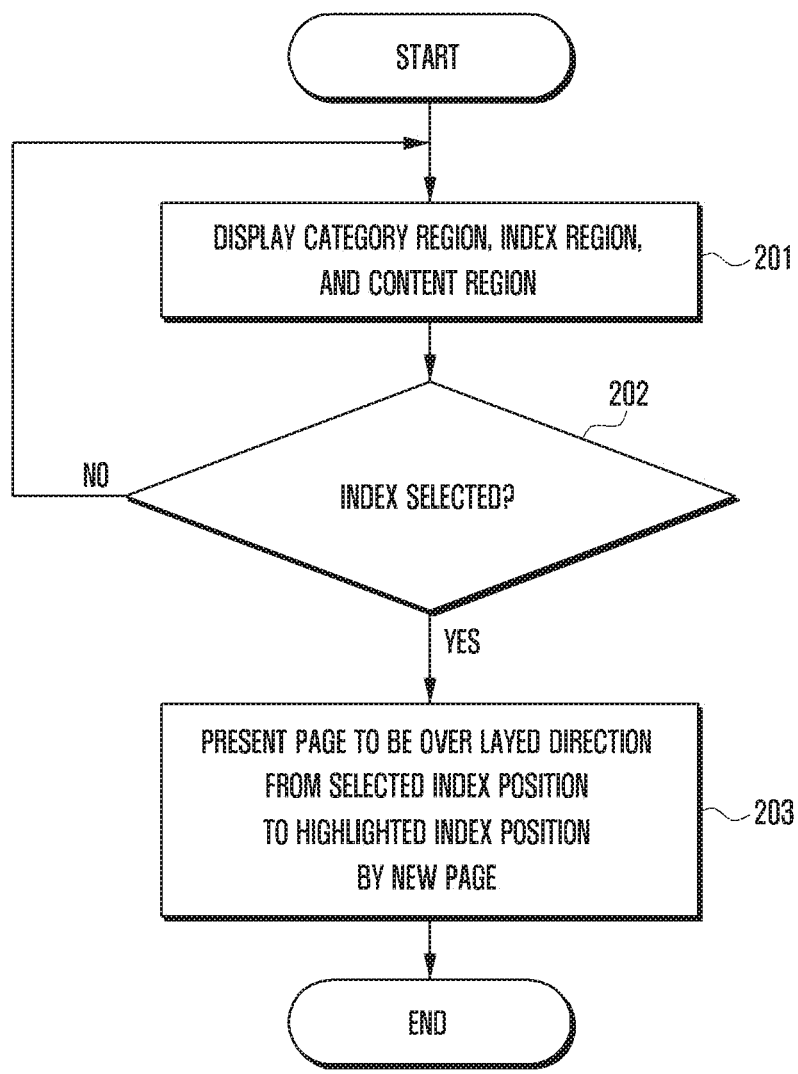
FIG. 2 is a flowchart illustrating a screen display method of the mobile terminal according to an embodiment of the present invention.

FIG. 2 is a flowchart illustrating a screen display method of the mobile terminal according to an embodiment of the present invention.

Referring to FIG. 2, the control unit 160 controls the display unit 142 to display a screen composed of the category region having the categories classified according to the top most conceptual classification criteria, an index region presenting the indices belonged to a currently selected category, and a content region presenting the content indicated by the currently highlighted index (201). The index region presents the indices in which one index is highlighted. According to an embodiment of the present invention, the index region can be configured such that the indices are arranged in series in a horizontal direction or a vertical direction.

According to the illustrated embodiment shown, the display screen is composed of the category region arranged on the top, the content region below the category region, and the index region below the content region. According to another embodiment of the present invention, the display screen may be composed of the category region on the top, the content region and index region positioned horizontally below the category region, the index region being located left or right of the content region. The display screen also can be configured such that the index region, the content region, and the category region are arranged in series from left to right. The display screen also can be configured such that the category region, the content region, and the index region are arranged in series from right to left.

In an exemplary embodiment of the present invention, the display screen can be a schedule management screen, for example. In this case, the category region can include the categories of 'date', 'week', and 'month'; the index region can include the indices of 1 to 31 for dates, indices of 'Sep 1-7, Sep 8-14, . . . for weeks, indices of Jan, Feb, Mar, . . . , Dec' for months; and the content region can include daily schedule content, weekly schedule content, and monthly schedule content, respectively. The content arranged in the content region may be configured in the form of a card item representing a combination of the content in the content region and an index list in the index region.

Figure 3:
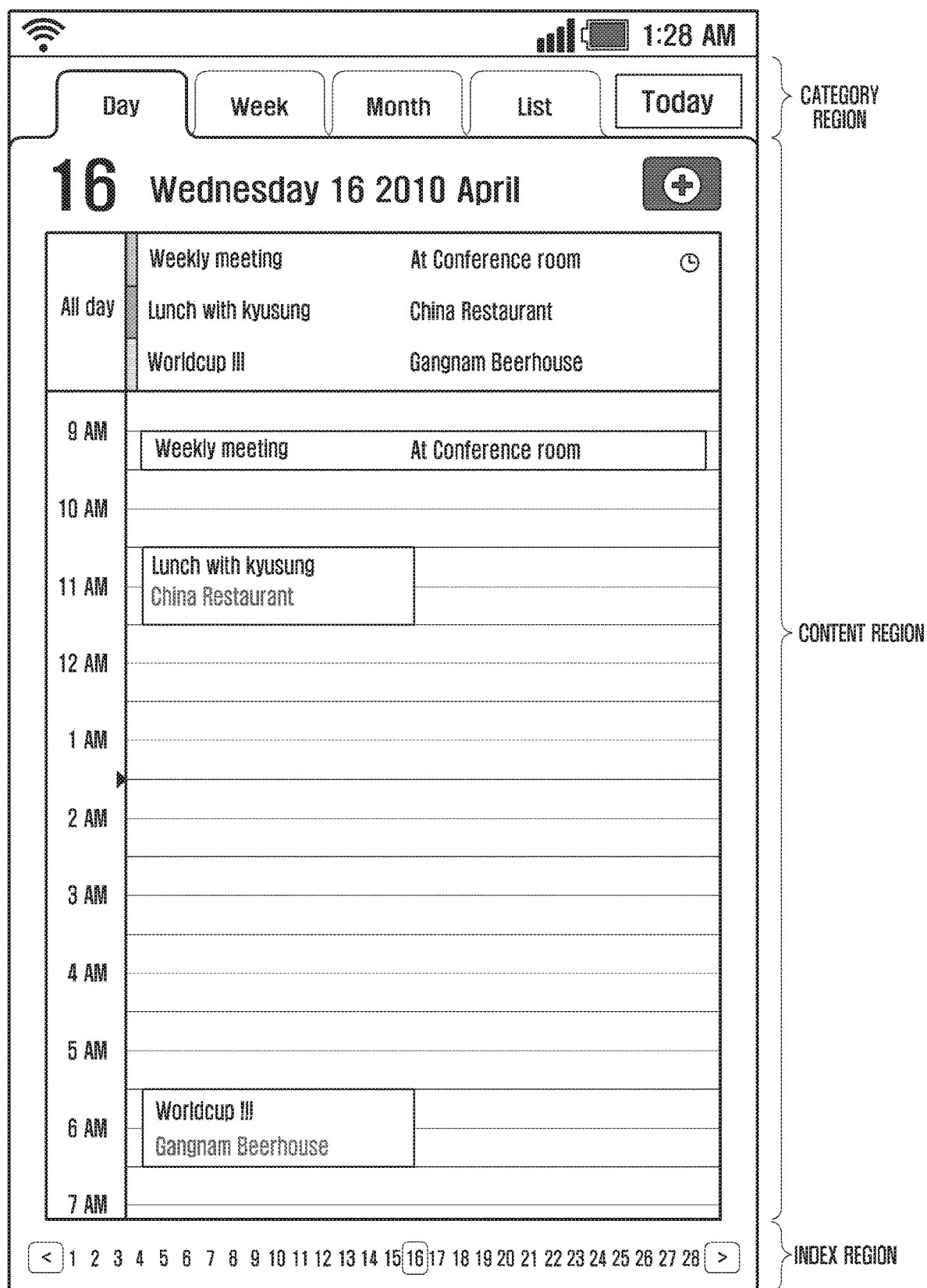
FIG. 3 is a diagram illustrating a calendar application screen of the mobile terminal 100 according to an embodiment of the present invention.

FIG. 3 is a diagram illustrating a calendar application screen of the mobile terminal 100 according to an embodiment of the present invention. The calendar application screen of FIG. 3 includes a category region, an index region, and a content region. The category region includes the categories of Date, Week, Month, and List. The category of Date is the category to show the daily schedule, the category of Week is the category to show the weekly schedule, and the category of Month is the category to show the monthly schedule. Meanwhile, the category of List is the category to show the list of the items representing individual schedules. In FIG. 3, the category region is provided with a Today key area (i.e, a tab). The Today key area is a navigation key to move to the current date (i.e., today) to show the contents belonging to the current date quickly.

The index region includes the date indices of 1, 2, 3, . . . categorized into the Date category and arranged in series with a currently selected index, e.g. 16, highlighted.

In the content region, the currently selected index of '16' is presented. The content region can be configured into an item as is shown or combined with the index list in the form of a card. The content region of FIG. 3 is composed of an organizer section presenting the items scheduled hourly and an 'All date' section presenting all of the items scheduled for the corresponding date. The content of FIG. 3 also includes a date indication section providing date information, e.g., 16 Wednesday 2010 April', and a new item key for creating a new item.

In this illustrative embodiment of the present invention (i.e., a calendar application screen) the display screen is composed of the index region and the content region without the category region.

After displaying a calendar application screen composed of the index region, and content region at step 201 (with or without the category region), the control unit 160 monitors the system to detect a key input for selecting one of the indices (202). The user can make a tap gesture to select an index on the display screen or a touch-and-move gesture in which a touch is made and then lifted after moving onto the target index. In case of the mobile terminal is configured without touchscreen (or in the case when an auxiliary key input is available as a supplement to a mobile terminal with a touchscreen), the control unit 160 can recognize the index selected by the user based on the key input made by means of the key input unit 150.

If an input (via the touchscreen or a key input device) for selecting an index is detected (step 202), the control unit 160 controls the display unit 142 such that the content corresponding to the selected index appears in the direction from the selected index position to the highlighted index position (203). That is, the control unit 160 determines the relative position of the index selected by the user with reference to the currently highlighted index and changes the display in an appropriate direction. In case that the indices are arranged in the horizontal direction (i.e., from left to right or right to left), the control unit 160 determines whether the index selected by the user is positioned to the left, or to the right, of the currently highlighted index. In case that the indices are arranged in the vertical direction (i.e., from top to bottom or bottom to top), the control unit 160 determines whether the index selected by the user is positioned above or below the currently highlighted index.

The control unit 160, next, controls the display unit 142 such that the content corresponding to the selected index appears on the screen in the direction from the selected index to the currently highlighted index. In case that the indices are arranged horizontally, (e.g., from left to right), the control unit 160 controls the display unit 142 such that the content corresponding to the selected index appears in the direction from left to right when the selected index is positioned to the left of the currently highlighted index and in the direction from the right to left when the selected index is positioned to the right of the currently highlighted index. In case that the indices are arranged vertically (e.g., from top to bottom), the control unit 160 controls the display unit 142 such that the content corresponding to the selected index appears in the direction from top to bottom when the selected index is positioned above the currently highlighted index and in the direction from bottom to top when the selected index is positioned below the currently highlighted index.

When the content appears, the control unit 160 can control the display unit 142 such that the content corresponding to the selected index is presented so as to be laid over (overlay) the previously displayed content. That is, the control unit 160 can control the display unit 142 such that the content of the index selected by the user covers up the previously display content without removing the previous content.

The control unit 160 also can control the display unit 142 such that the content region and the index region are modified while maintaining the presentation of the category region. In case that the content and the index list is configured as an item in the form of a card, when the user selects one of the indices, the control unit 160 controls the display unit 142 such that a card formed by combining the index list in which the selected index is highlighted and the content corresponding to the selected index appears over the previously displayed card.

Figure 4:
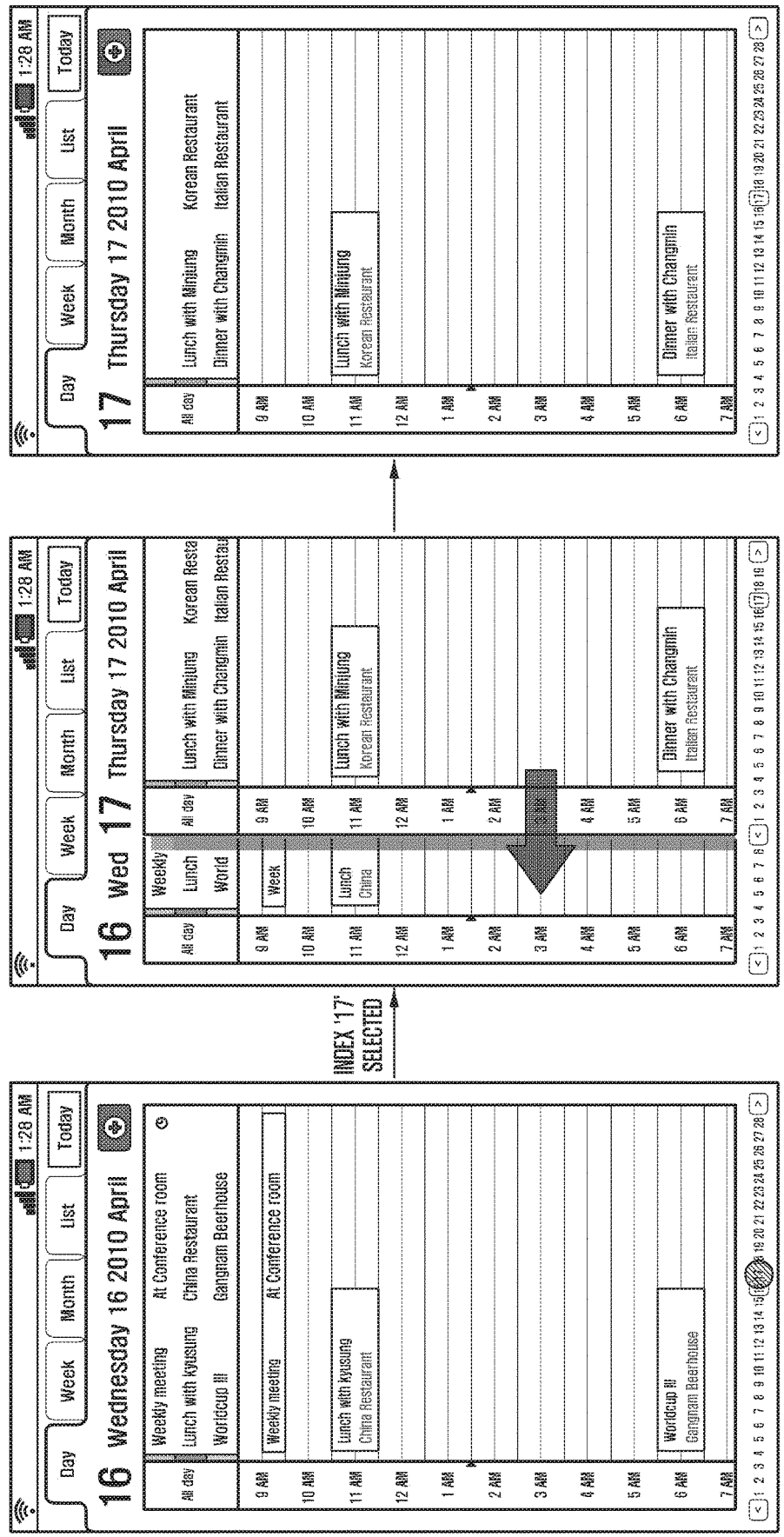
FIG. 4 is a diagram illustrating a daily view screen change operation of a calendar application when an index positioned to the right of the currently highlighted index is selected in the mobile terminal according to an embodiment of the present invention.

FIG. 4 is a diagram illustrating a daily view screen change operation of a calendar application when an index positioned to the right of the currently highlighted index is selected in the mobile terminal according to an embodiment of the present invention.

Part [a] of FIG. 4 is identical with FIG. 3. In part [a] of FIG. 4, the daily view screen includes the category region in which the Day tap area is selected, the index region in which the index of "16" is selected, and the content region presenting the items scheduled for the date of 2010 Apr. 16. The daily schedule includes the items entitled 'Weekly meeting', 'Lunch with kyusung', and 'worldcup!!!'. The scheduled items are presented in both the hourly organizer section and the 'All date' section. If the user makes a tap gesture to the index of "17" on the screen in the state of part [a] of FIG. 4, the page configured with the index list in which the index of "17" is highlighted and the content including the items scheduled for the date of 2010 Apr. 17 appears in the direction from right to left as shown in part [b] of FIG. 4. Since the selected index of "17" is positioned to the right of the currently highlighted index of "16," the card corresponding to the date of 2010 Apr. 17 appears on the screen in the direction from right to left. Part [b] of FIG. 4 shows the card corresponding to the date of 2010 Apr. 17 which is appearing on the screen in the direction from right to left. As the page corresponding to the date of 2010 Apr. 17 appears from right to left, the content including the items scheduled on the date of 2010 Apr. 17 overlays the content including the items scheduled on the date of 2010 Apr. 16 gradually from right to left, and the index list in which the index of "17" is highlighted overlays the index list in which the index of "16" was highlighted.

Part [c] of FIG. 4 shows the screen on which the page of the date of 2010 Apr. 16 has been replaced by the page of the date of 2010 Apr. 17. The page of the date of 2010 Apr. 17 includes the items entitled 'Lunch with Minjung' and 'Dinner with changmin'.

Figure 5:
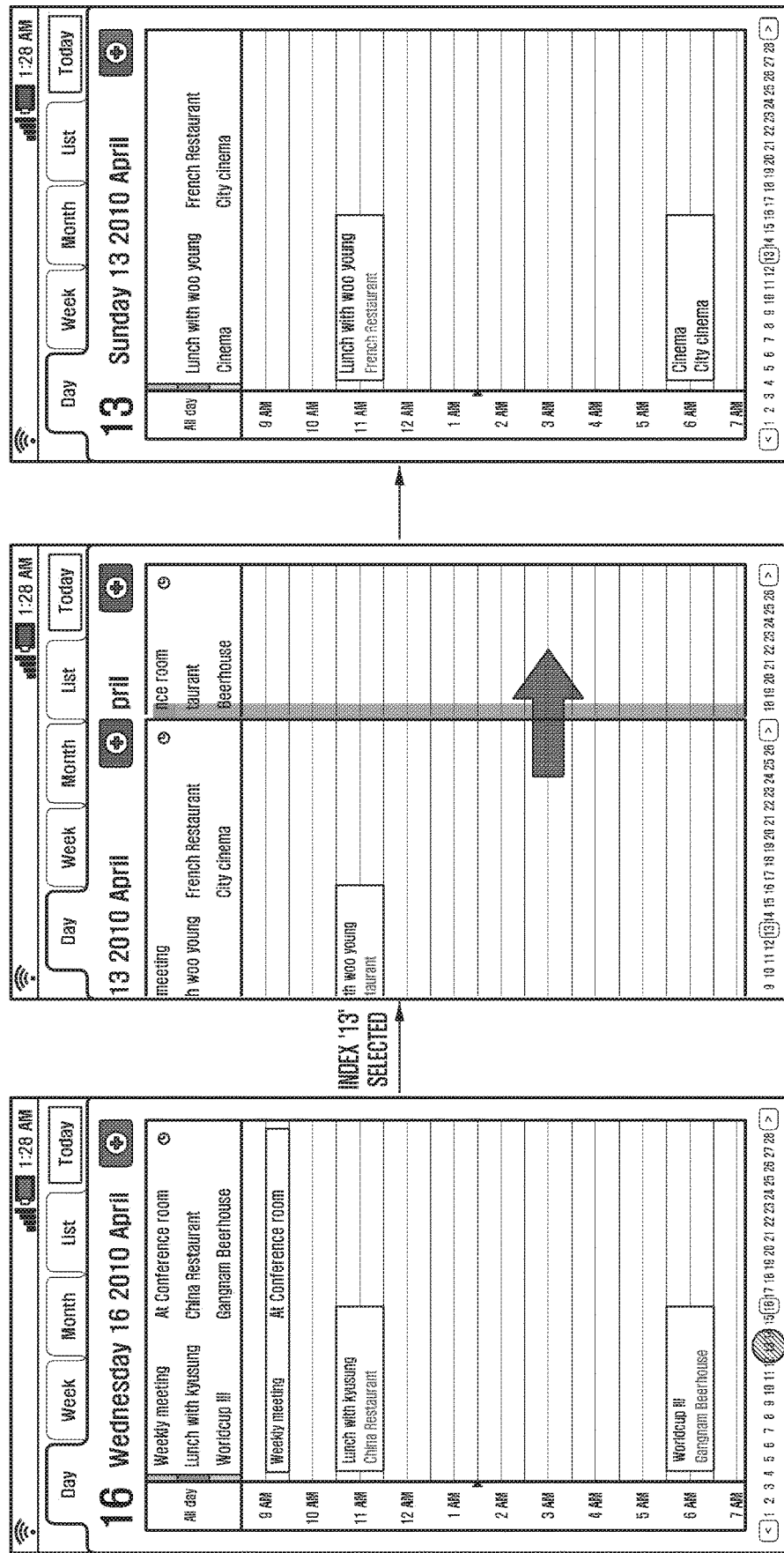
FIG. 5 is a diagram illustrating a daily view screen change operation of a calendar application, when an index positioned to the left of the currently highlighted index is selected, in the mobile terminal according to an embodiment of the present invention.

FIG. 5 is a diagram illustrating a daily view screen change operation of a calendar application, when an index positioned at the left of the currently highlighted index is selected, in the mobile terminal according to an embodiment of the present invention.

Part [a] of FIG. 5 is identical with part [a] of FIG. 4 in which the daily view screen configured in the form of a page including the category region in which the Day tap area is selected, the index region in which the index of "16" is highlighted, and the content region presenting the items scheduled for the date of 2010 Apr. 16. When the user makes a tap gesture to the index of "13" on the screen in the state of part [a] of FIG. 5, the page configured with the index list in which the index of "13" is highlighted and the content including the items scheduled for the date of 2010 Apr. 13 appears in the direction from left to right as shown in part [b] of FIG. 5. Since the selected index of "13" is positioned to the left of the currently highlighted index of "16," the card corresponding to the date of 2010 Apr. 13 appears on the screen in the direction from left to right. Part [2] of FIG. 5 shows the card corresponding to the date of 2010 Apr. 13 which appears on the screen in the direction from left to right. As the page of the date of 2010 Apr. 13 appears from left to right, the content including the items scheduled on the date of 2010 Apr. 13 overlays the content including the items scheduled on the date of 2010 Apr. 16 gradually from the left to the right, and the index list in which the index of "13" is highlighted overlays the index list in which the index of "16" was highlighted.

Part [c] of FIG. 5 is shows the screen on which the page of the date of 2010 Apr. 16 has been replaced by the page of the date of 2010 Apr. 13. The page of the date of 2010 Apr. 13 includes the items entitled 'Lunch with Wooyoung' and 'Cinema'.

Figure 6:
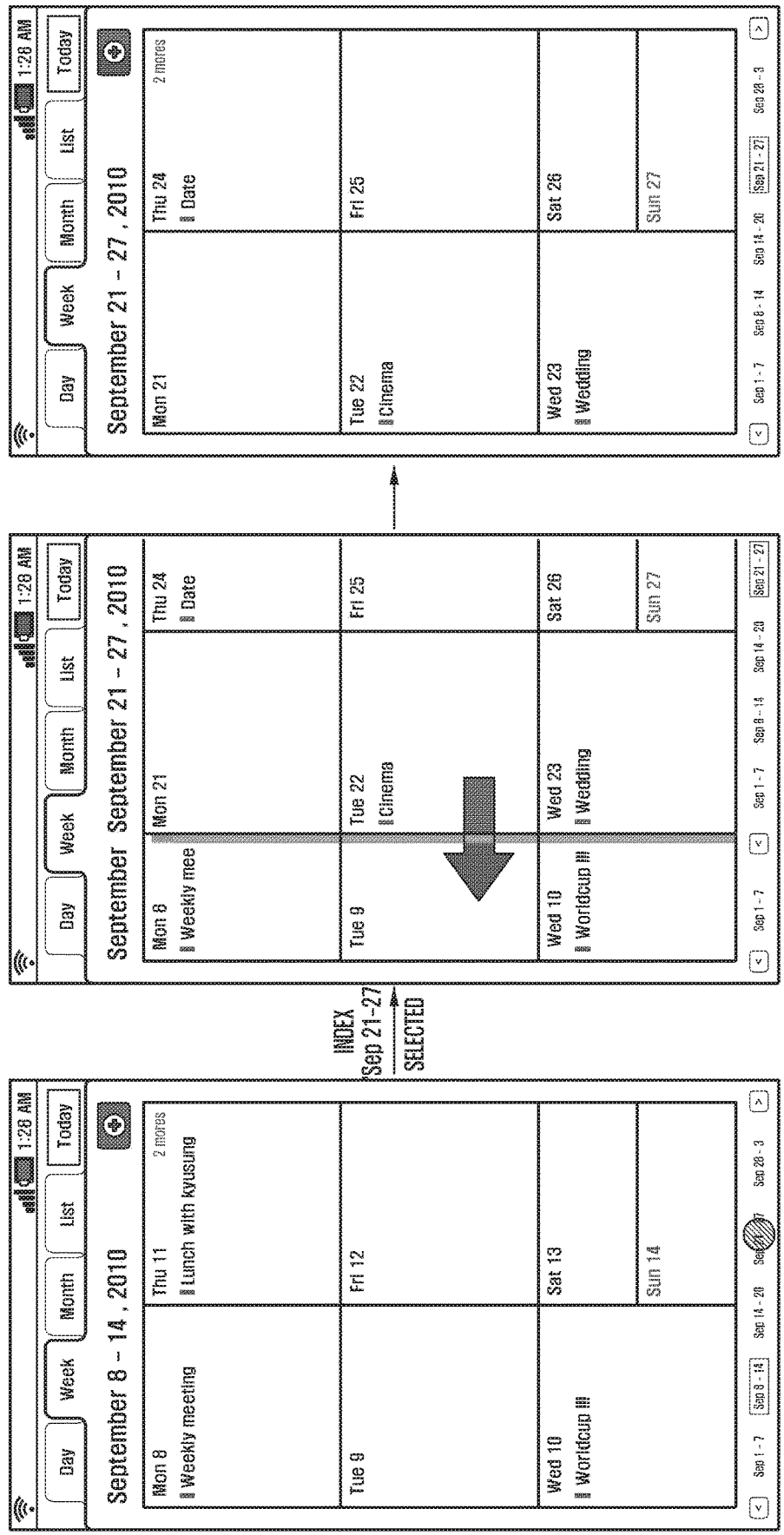
FIG. 6 is a diagram illustrating a weekly view screen change operation of a calendar application when an index positioned to the right of the currently highlighted index is selected in the mobile terminal according to an embodiment of the present invention.

FIG. 6 is a diagram illustrating a weekly view screen change operation of a calendar application when an index positioned at the right of the currently highlighted index is selected in the mobile terminal according to an embodiment of the present invention.

In part [a] of FIG. 6, the weekly view screen is composed of the category region in which the Week tap area is selected, the index region in which the index of 'Sep 8-14' is selected, and the content region in which the items scheduled for the week of Sep. 8-14, 2010. The weekly schedule for Sep. 8-14, 2010 includes the items entitled 'Weekly meeting', 'Lunch with kyusung', and 'worldcup!!!'. If the user makes a tap gesture on the index of 'Sep 21-27' on the screen in the state of part [a] of FIG. 6, the page configured with the index list in which the index of 'Sep 21-27' is highlighted and the content including the items scheduled for the week of Sep. 21-27, 2010 appears in the direction from right to left as shown in part [b] of FIG. 6. Since the selected index of 'Sep 21-27' is positioned to the right of the currently highlighted index of 'Sep 8-14', the card corresponding to the week of September 21-27, 2010 appears on the screen in the direction from right to left. Part [b] of FIG. 6 shows the card corresponding to the week of Sep. 21-27, 2010 which appears on the screen in the direction from right to left. As the page of the week of September 21-27, 2010 appears from right to left, the content including the items scheduled for Sep. 21-24, 2010 overlays the content including the items scheduled for September 8-14 gradually from right to left, and the index list in which the index of Sep 21-27 is highlighted gradually overlays the index list in which the index of Sep 80-14 was highlighted, from right to left.

Part [c] of FIG. 6 shows the weekly view screen on which the page of the week of Sep. 8-14, 2010 has been replaced by the page of the week of Sep. 21-27, 2010. The page of the week of Sep. 21-27, 2010 includes the items entitled 'Date', 'Cinema', and 'Wedding'.

Figure 7:
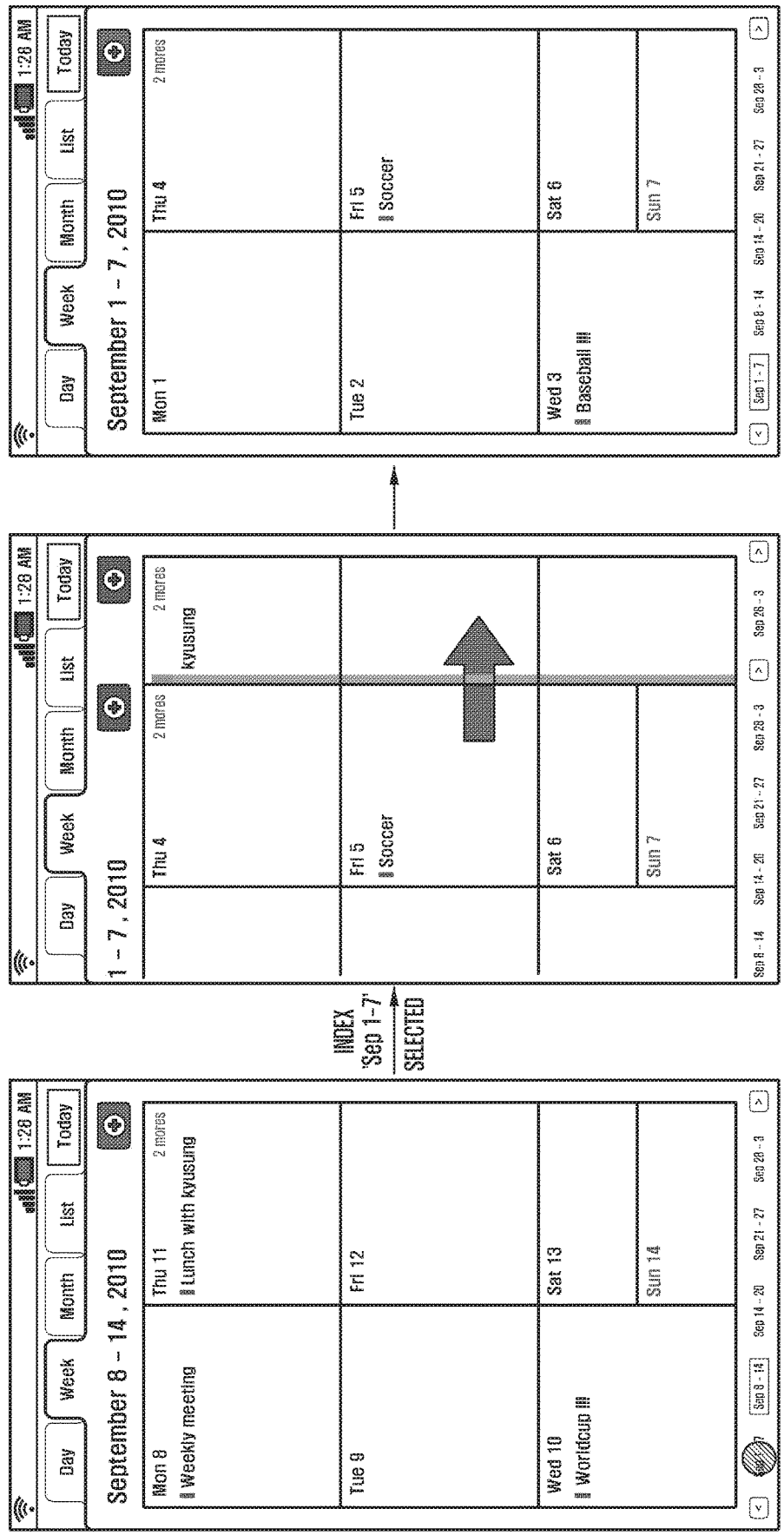
FIG. 7 is diagram illustrating a weekly view screen change operation of a calendar application when an index positioned to the left of the currently highlighted index is selected in the mobile terminal according to an embodiment of the present invention.

FIG. 7 is diagram illustrating a weekly view screen change operation of a calendar application when an index positioned at the left of the currently highlighted index is selected in the mobile terminal according to an embodiment of the present invention.

In part [a] of FIG. 7, the weekly view screen is composed of the category region in which the Week tap area is selected, the index region in which the index of 'Sep 8-14' is selected, and the content region includes the items scheduled for the weeks of Sep. 8-14, 2010. If the user makes a tap gesture to the index of 'Sep 1-7' on the screen in the state of part [a] of FIG. 7, the page configured with the index list in which the index of 'Sep 1-7' is highlighted and the content including the items scheduled for the week of the Sep. 1-7, 2010 appears in the direction from left to right as shown in part [b] of FIG. 7. Since the selected index of 'Sep 1-7' is positioned to the left of the currently highlighted index of 'Sep 8-14', the card corresponding to the week of Sep. 1-7, 2010 appears on the screen in the direction from left to right. Part [b] of FIG. 7 shows the card corresponding to the week of Sep. 1-7, 2010 which appears on the screen in the direction from left to right. As the page of the week of Sep. 1-7, 2010 appears from left to right, the content including the items scheduled for Sep. 1-7, 2010 gradually overlays the content including the items scheduled for September 8-14 from left to right, and the index list in which the index of Sep 1-7 is highlighted gradually overlays the index list in which the index of Sep 8-14 was highlighted.

Part [c] of FIG. 7 shows the weekly view screen on which the page of the week of Sep. 8-14, 2010 has been replaced by the page of the week of Sep. 1-7, 2010. The page of the week of Sep. 1-7, 2010 includes the items entitled 'Soccer' and 'Baseball'.

Figure 8:
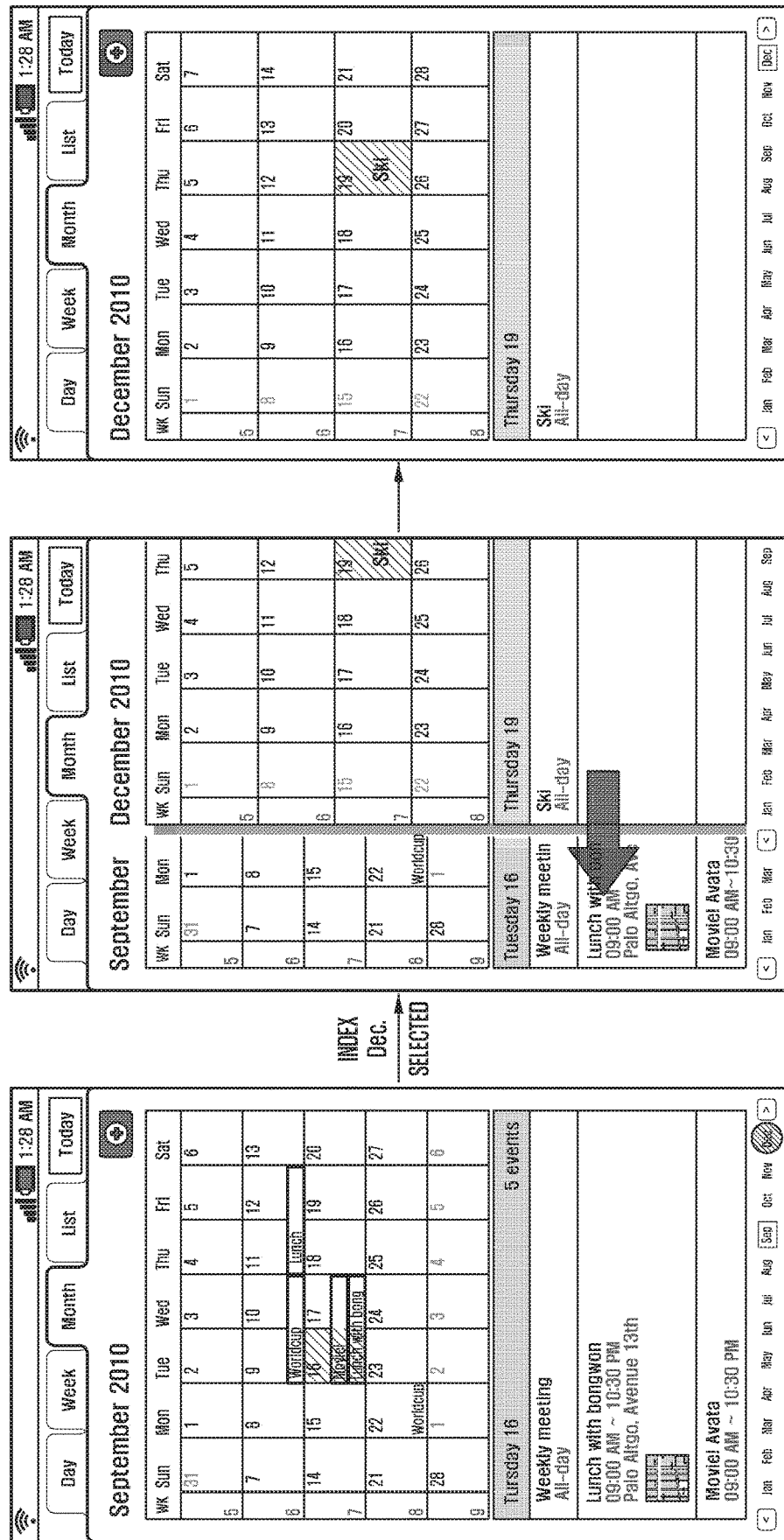
FIG. 8 is a diagram illustrating a monthly view screen change operation of a calendar application when an index positioned to the right of the currently highlighted index is selected in the mobile terminal according to an embodiment of the present invention.

FIG. 8 is a diagram illustrating a monthly view screen change operation of a calendar application when an index positioned to the right of the currently highlighted index is selected in the mobile terminal according to an embodiment of the present invention.

In part [a] of FIG. 8, the monthly view screen is composed of the category region in which the Month tap area is selected, the index region in which the index of 'Sep' is selected, and the content region in which the items scheduled for the month of September 2010. The monthly schedule for September 2010 includes the items entitled 'Weekly meeting', 'Lunch with bong', 'worldcup!!', and 'lunch meeting'. If the user makes a tap gesture to the index of 'Dec' on the screen in the state of part [a] of FIG. 8, the page configured with the index list in which the index of 'Dec' is highlighted and the content including the items scheduled for the month of September 2010 appears in the direction from right to left as shown in part [b] of FIG. 8. Since the selected index of 'Dec' is positioned to the right of the currently highlighted index of 'Sep', the card corresponding to the month of December 2010 appears on the screen in the direction from right to left. Part [b] of FIG. 8 shows the card corresponding to the month of December 2010 which appears on the screen in the direction from right to left. As the page of the month of December 2010 appears from right to left, the content including the items scheduled for December 2010 gradually overlays, from right to left, the content including the items scheduled for September 2010, and the index list in which the index of Dec is highlighted gradually overlays, from right to left, the index list in which the index of Sep was highlighted.

Part [c] of FIG. 8 shows the monthly view screen on which the page of the month of September 2010 has been replaced by the page of the month of December 2010. The page of the month of December 2010 includes the item entitled 'Ski'.

FIG. 9 is a diagram illustrating a monthly view screen change operation of a calendar application when an index positioned at the left of the currently highlighted index is selected in the mobile terminal according to an embodiment of the present invention.

In part [a] of FIG. 9, the monthly view screen is composed of the category region in which the Month tap area is selected, the index region in which the index of 'Sep' is selected, and the content region in which the items scheduled for the month of Sep. 2010. If the user makes a tap gesture to the index of 'Jan' on the screen in the state of part [a] of FIG. 9, the page configured with the index list in which the index of 'Jan' is highlighted and the content including the items scheduled for the month of January 2010 appears in the direction from left to right as shown in part [b] of FIG. 9. Since the selected index of 'Jan' is positioned to the left of the currently highlighted index of 'Sep', the page corresponding to the month of January 2010 appears on the screen in the direction from left to right. Part [b] of FIG. 9 shows the page corresponding to the month of January 2010 which appears on the screen in the direction from left to right. As the page of the month of January 2010 appears from left to right, the content including the items scheduled for January 2010 gradually overlays, from left to right, the content including the items scheduled for September 202, and the index list in which the index of Jan is highlighted gradually overlays, from left to right, the index list in which the index of Sep was highlighted.

Part [c] of FIG. 9 shows the monthly view screen on which the page of the month of September 2010 has been replaced by the page of the month of January 2010. The page of the month of January 2010 includes the item entitled 'Weekly movie'.

When the category of 'Month' and the index of a certain month are selected respectively in the category region and the index region, the control unit 160 controls the display unit 142 such that the monthly view screen having the items scheduled in the corresponding month is displayed. For example, the control unit 160 controls the display unit 142 such that the monthly view screen, including the calendar of the month and the list of the items (scheduled for the month) arranged below the monthly calendar. If the user selects a certain date on the monthly calendar, the control unit 160 controls the display unit 142 such that the selected date is highlighted and presents the items scheduled on the selected date in a schedule information section.

Part [a] of FIG. 8 shows an exemplary monthly view page composed on a monthly calendar and a schedule information section. The date of 16 September is highlighted in the monthly calendar, and the schedule information on 16 September is presented in the schedule information section below the calendar. If the date of 9 September is selected by the user in the state of part [a] of FIG. 8, the schedule information on 16 September is replaced by the schedule information associated with 9 September in the schedule information section.

In case of the mobile terminal equipped with a display unit having a horizontal width that is longer than the vertical length (i.e., a landscape mode), the control unit 160 can control the display unit 142 such that the schedule information section is arranged to the left or to the right of the monthly calendar. According to an embodiment of the present invention, the display unit 142 can be configured to display a yearly calendar view button in the content region such that, when the user selects the yearly calendar view button, the control unit 160 controls the display unit 142 to present a yearly calendar in full screen mode without the schedule information section.

According to an embodiment of the present invention, the index selection can be made with a drag gesture as well as the tap gesture on the screen. If a touch gesture is detected by means of the touch sensing unit 141, the control unit 160 determines whether the touch gesture is a tap gesture or a touch-and-move gesture and, if the touch gesture is a touch-and-move gesture, the control unit 160 controls the display unit 142 to show the cursor at the end position of the touch-and-move gesture. At this time, the control unit 160 controls the display unit 142 to keep the presentation status of the content region. Afterward, if a lift-off of the touch is detected by means of the touch sensing unit 141, the control unit controls the display unit 142 such that the currently presented schedule information is replaced by the schedule information corresponding to the index at which the lift-off of the touch is detected.

Figure 10:
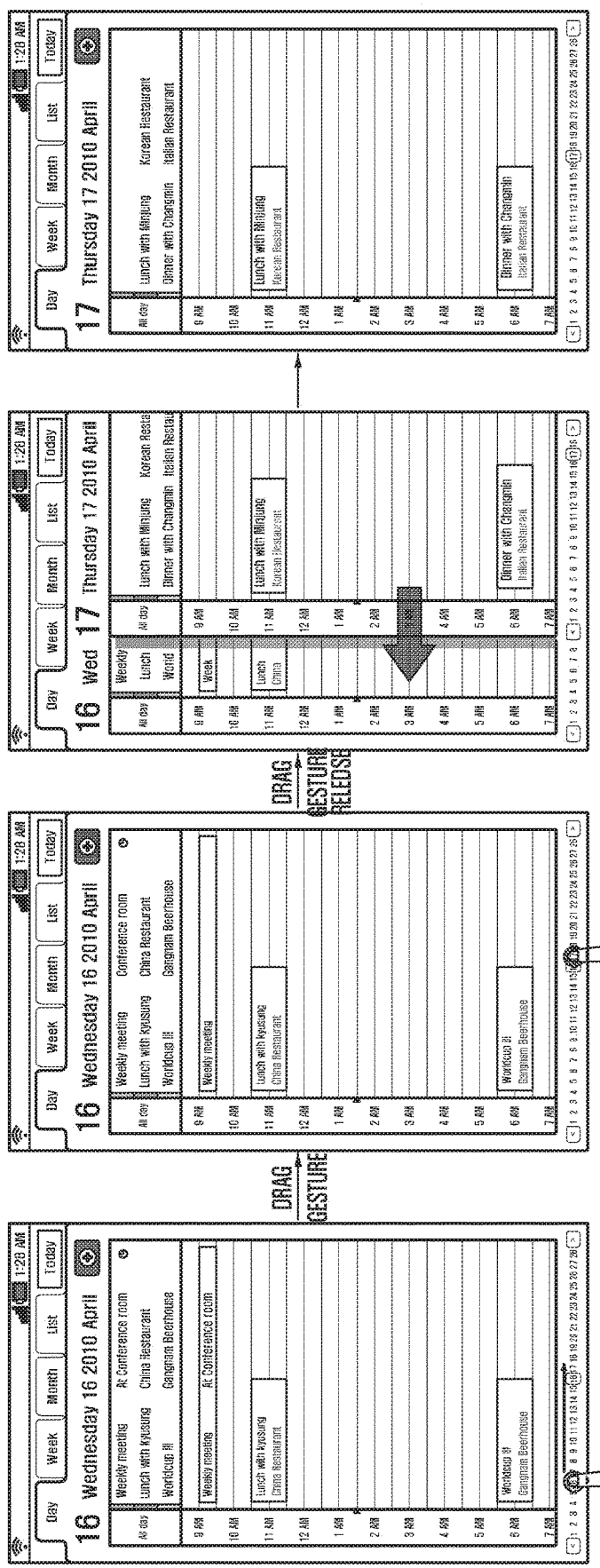
FIG. 10 is a diagram illustrating a daily view screen change operation of a calendar application when an index positioned to the right of the currently highlighted index is selected with a drag gesture in the mobile terminal according to an embodiment of the present invention.

FIG. 10 is a diagram illustrating a daily view screen change operation of a calendar application when an index positioned to the right of the currently highlighted index is selected with a drag gesture in the mobile terminal according to an embodiment of the present invention.

In part [a] of FIG. 10, the daily view screen includes the category region in which the Day tap area is selected, the index region in which the index of 16 is selected, and the content region in which the items scheduled for the date of 2010 Apr. 16. Part [a] of FIG. 10 shows the daily view screen on which a drag gesture has been made from the index of 6 to the index of 16 in the index region, and part [b] of FIG. 10 shows the daily view screen when the drag gesture is extended to index 17. Part [c] of FIG. 10 shows the daily view screen change when the drag gesture is released on the index 17. In part [c] of FIG. 10, the page configured with the index list in which the index 17 is highlighted and the content including the items scheduled for the date of 2010 Apr. 17 appears in the direction from right to left. Part [d] of FIG. 10 shows the daily view screen in which the page associated with the date of 2010 Apr. 16 has been completely replaced by the page associated with the date of 2010 Apr. 17. Parts [c] and [d] of FIG. 10 show the daily view screens identical with those of parts [b] and [c] of FIG. 4, and thus the descriptions on the daily view screens of parts [b] and [c] of FIG. 4 can be applied to parts [c] and [d] of FIG. 10.

According to an embodiment of the present invention, the user can navigate to the page of a select date by selecting a button provided in the content region rather than selecting an index associated with the date in the index region. For example, the display unit 142 can display a 'today schedule view button'. If the user selects the 'today schedule view button', the control unit 160 recognizes the selected date by means of the touch sensing unit 141 and determines whether the currently highlighted date is earlier or later than "Today." If the currently highlighted date is later than "Today," the control unit 160 controls the display unit 142 such that the page composed of the index region in which "today" is highlighted and the content region presenting the items scheduled for "Today" appears in the direction from right to left.

FIG. 11 is a diagram illustrating a daily view screen change operation of a calendar application when a "today" button is selected in a state where the Day category is activated in the mobile terminal according to an embodiment of the present invention.

In part [a] of FIG. 11, the daily view screen is configured with a page including the category region in which the Day tap area is selected, the index region in which the index of 16 is selected, and the content region in which the items scheduled for the date of 2010 Apr. 16. Part [a] of FIG. 11 shows the daily view screen on which the 'Today' button (i.e., tab) is selected by the user. Part [b] of FIG. 11 shows the daily view screen in which the page of the date of 2010 Apr. 16 is being replaced by the page of today in response to the selection of the 'Today' button. Assuming that today is Apr. 17, 2010 (2010.04.17), the page composed of the index region in which the index of 17 is highlighted and the content region having the items scheduled for the date of 2010 Apr. 17 appears in the direction from right to left. Part [c] of FIG. 11 shows the daily view screen in which the page of the date of 2010 Apr. 16 has been completely replaced by the page of the date of 2010 Apr. 17. Parts [b] and [c] of FIG. 11 show the daily view screens identical with those of parts [b] and [c] of FIG. 4 and thus the descriptions on the daily view screens of parts [b] and [c] of FIG. 4 can be identically applied to those of FIG. 11.

According to an embodiment of the present invention, the control unit 160 controls the display unit 142 such that only the highlight moves from the old index to the new index while the content region is changed unlike the case of FIG. 4 in which, when the page of the date of 2010 Apr. 16 is replaced by the page of the date of 2010 Apr. 17, the page configured with the index region in which the index of 17 is highlighted and the content region including the items scheduled for the date of 2010 Apr. 17 appears in the direction from right to left. This means that the index list of the index region is replaced by a new index list.

The control unit 160 can control the operation of the screen such that the page configured with content corresponding to the date of 2010 Apr. 17 appears on the screen of the display unit 142 while the highlight moves from the index 16 to the index 17 in the index region.

FIG. 12 is a diagram illustrating a daily view screen change operation of a calendar application, when an index positioned to the left of the currently highlighted index is selected according to another embodiment of the present invention.

Part [a] of FIG. 12 is identical to part [a] of FIG. 4, and the description on part [a] of FIG. 4 is identically applied to part [a] of FIG. 12, and is repeated as if in full, here. The daily view screen of part [a] of FIG. 12 is configured with a page including the category region in which the Day tap area is selected, the index region in which the index 16 is highlighted, and the content region presenting the items scheduled for the date of 2010 Apr. 16. Part [a] of FIG. 12 shows the daily view screen on which the user makes a tap gesture on the index 17, part [b] of FIG. 12 shows the daily view screen on which the page having the content region presenting the items scheduled for the date of 2010 Apr. 17 appears in the direction from right to left, and part [c] of FIG. 12 shows the daily view screen on which the page associated with the date of 2010 Apr. 16 has been completely replaced by the page associated with the date of 2010 Apr. 17. It is noted that the index list is not replaced but only the highlight moves from the index 16 to the index 17 in part [b] of FIG. 12.

According to an embodiment of the present invention, the index region can be configured such that the indices are arranged in vertical direction rather than horizontal direction. In this case, the control unit 160 detects the selection of an index by means of the touch sensing unit 141, determines whether the selected index is positioned above or below the currently highlighted index, and controls the operation such that the page of the date indicated by the selected index appears in the direction from top to bottom when the selected index is positioned above the currently highlighted index and in the direction from bottom to top when the selected index is positioned below the currently highlighted index. At this time, the control unit 160 configures the page having the index region in which the selected index is highlighted and the content region presenting the items scheduled for the date corresponding to the selected index and controls the display unit 142 such that the configured page appears in the direction from top to bottom of the daily view screen.

FIG. 13 is a diagram illustrating a daily view screen change operation of a calendar application, when an index positioned below the currently highlighted index is selected in the index region configured in vertical direction, in the mobile terminal according to an embodiment of the present invention.

Part [a] of FIG. 13 shows the daily view screen configured with a page including the category region in which the Day tap area is selected, the index region in which index 16 is selected, and the corresponding content region illustrates the items scheduled for the date of 2010 Apr. 16. Part [b] of FIG. 13 shows the daily view screen on which the page having the index region in which the index 17 is highlighted and the content region presenting the items scheduled for the date of 2010 Apr. 17 appears in the direction from the bottom to the top of the screen when the index 17 is selected by the user. Part [c] of FIG. 13 shows the daily view screen on which the page of the date of 2010 Apr. 16 is completely replaced by the page of the dated of 2010.04.17.

FIG. 14 is a diagram illustrating a daily view screen change operation of a calendar application, when an index positioned above the currently highlighted index is selected in the index region configured in vertical region, in the mobile terminal according to an embodiment of the present invention.

Part [a] of FIG. 14 shows the daily view screen configured with a page including the category region in which the Day tap area is selected, the index region in which the index of 16 is selected, and the corresponding content region illustrates the items scheduled for the date of 2010 Apr. 16.

Part [b] of FIG. 14 shows the daily view screen on which the page having the index region in which the index of 13 is highlighted and the content region presenting the items scheduled for the date of 2010 Apr. 13 appears in the direction from the top to the bottom of the screen when the index of 13 is selected by the user. Part [c] of FIG. 14 shows the daily view screen in which the page of the date of 2010 Apr. 16 is completely replaced by the page of the dated of 2010.04.13.

Although the description has been directed to the schedule management screen, the present invention is not limited thereto but can be applied to various applications such as a music playback application, a video playback application, a phonebook application, and a massaging application. In case of the music playback application, the category region can present the categories of 'name', 'genre', and 'year'; and the 'genre' category can be further categorized into subcategories such as 'Ballad', 'Jazz', and 'Rock'. The indices can be arranged horizontally in alphabetical order such that, when the index of a ballad is selected while the index associated with "Jazz" is highlighted, the page configured for ballads appears in the direction from left to right and, when the index associated with "Rock" is selected, the page configured for "Rock" appears in the direction from right to left.

The above-described methods according to the present invention can be realized in hardware or via the execution of software or computer code that can be stored in a recording medium such as a CD, a ROM, a RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. The code when loaded into a general purpose computer transformed the general purpose computer into a special purpose computer that may in part be dedicated to the processing shown herein.

In the screen display method and apparatus of the present invention, when a content page is changed for another content page, the new content page appears in the same direction as index arrangement direction, whereby the user can input the screen change command intuitively, resulting in improvement of manipulation intuitiveness. While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A mobile device executing a calendar application, the mobile device comprising:
   a touch display screen; and
   at least one processor configured to:
      receive schedule information corresponding to more than one date, the receiving of the schedule information corresponding to the more than one date includes receiving first schedule information corresponding to a first date, and receiving second schedule information corresponding to a second date, the second date having a difference of at least two days from the first date,
      cause the touch display screen to display a screen including an index region for displaying a plurality of dates, and a content region for displaying schedule information corresponding to a selected date, and
      while the first date is the selected date and the first schedule information corresponding to the first date is displayed in the content region, and responsive to receiving an input to the index region selecting the second date that has the difference of at least two days from the first date:
         obtain the second schedule information corresponding to the second date to be displayed,
         determine a slide direction of the second schedule information according to the second date in relation to the first date in the index region, and
         cause the touch display screen to transition from displaying the first schedule information in the content region to displaying the second schedule information in the content region,
   wherein the transition from the displaying of the first schedule information in the content region to the displaying of the second schedule information in the content region includes sliding the second schedule information into the content region based on the determined slide direction,
   wherein at least a portion of the second schedule information is displayed in the content region during the sliding of the second schedule information into the content region, and
   wherein schedule information corresponding to any date between the first date and the second date is not displayed in the content region during the transition from the displaying of the first schedule information in the content region to the displaying of the second schedule information in the content region.

2. The mobile device of claim 1,
wherein the screen further comprises a category region containing at least one category, and
wherein the display of the content region is based on the category selected in the category region.

3. The mobile device of claim 1, wherein the first schedule information and the second schedule information comprise a timeline region.

4. The mobile device of claim 1, wherein the second date is highlighted in the index region in response to the receiving of the input to the index region selecting the second date.

5. The mobile device of claim 1, wherein the transition from the displaying of the first schedule information in the content region to the displaying of the second schedule information in the content region includes removing the first schedule information from the content region.

6. The mobile device of claim 1, wherein the input to the index region selecting the second date is a tap event.

7. The mobile device of claim 1, wherein the plurality of dates displayed in the index region is arranged in series horizontally.

8. The mobile device of claim 1, wherein, during the sliding of the second schedule information into the content region, a portion of the first schedule information and a portion of the second schedule information are together displayed in the content region temporarily.

9. The mobile device of claim 1, wherein an edge of the second schedule information sliding into the content region corresponds to a line perpendicular to a slide direction of the second schedule information.

10. The mobile device of claim 1, wherein the second schedule information displayed in the content region includes one or more scheduling items, each scheduling item being displayed in a visually delignated block in the content region that visually corresponds to an associated time and includes a textual description therein.

11. The mobile device of claim 1, wherein a key is displayed on the screen for adding scheduling information.

12. A method for executing a calendar application, the method comprising:
receiving schedule information corresponding to more than one date, the receiving of the schedule information corresponding to the more than one date includes receiving first schedule information corresponding to a first date, and receiving second schedule information corresponding to a second date, the second date having a difference of at least two days from the first date,
displaying a screen including an index region for displaying a plurality of dates, and a content region for displaying schedule information corresponding to a selected date, and
while the first date is the selected date and the first schedule information corresponding to the first date is displayed in the content region, and responsive to receiving an input to the index region selecting the second date that has the difference of at least two days from the first date:
obtaining the second schedule information corresponding to the second date to be displayed,
determining a slide direction of the second schedule information according to the second date in relation to the first date in the index region, and
transitioning from displaying the first schedule information in the content region to displaying the second schedule information in the content region,
wherein the transitioning from the displaying of the first schedule information in the content region to the displaying of the second schedule information in the content region includes sliding the second schedule information into the content region based on the determined slide direction,
wherein at least a portion of the second schedule information is displayed in the content region during the sliding of the second schedule information into the content region, and
wherein schedule information corresponding to any date between the first date and the second date is not displayed in the content region during the transition from the displaying of the first schedule information in the content region to the displaying of the second schedule information in the content region.

13. The method of claim 12,
wherein the screen further comprises a category region containing at least one category, and
wherein the content region is displayed based on the category selected in the category region.

14. The method of claim 12, wherein the first schedule information and the second schedule information comprise a timeline region.

15. The method of claim 12, wherein the second date is highlighted in the index region in response to the receiving of the input to the index region selecting the second date.

16. The method of claim 12, wherein the transitioning from the displaying of the first schedule information in the content region to the displaying of the second schedule information in the content region includes removing the first schedule information from the content region.

17. The method of claim 12, wherein the plurality of dates displayed in the index region is arranged in series horizontally.

18. The method of claim 12, wherein, during the sliding of the second schedule information into the content region, a portion of the first schedule information and a portion of the second schedule information are together displayed in the content region temporarily.

19. The method of claim 12, wherein an edge of the second schedule information sliding into the content region corresponds to a line perpendicular to a slide direction of the second schedule information.

20. The method of claim 12, wherein the second schedule information displayed in the content region includes one or more scheduling items, each scheduling item being displayed in a visually delignated block in the content region that visually corresponds to an associated time and includes a textual description therein.

* * * * *